United States Patent [19]  [11] 4,265,768
Beasley et al.  [45] May 5, 1981

[54] ION EXCHANGE MATERIAL PREPARED FROM PARTIALLY PYROLYZED MACROPOROUS POLYMER PARTICLES

[75] Inventors: Glenn H. Beasley, Newtown; Berni P. Chong, Dresher, both of Pa.; Warren T. Ford, Stillwater, Okla.; James W. Neely, Dresher, Pa.

[73] Assignee: Rohm and Haas Company, Philadelphia, Pa.

[21] Appl. No.: 107,114

[22] Filed: Dec. 26, 1979

[51] Int. Cl.³ .......................... B01J 39/24; B01J 41/18
[52] U.S. Cl. .......................................... 210/682; 55/74; 252/436; 252/438; 252/439; 423/6
[58] Field of Search ............... 55/74; 210/24, 37–40; 252/421, 426, 436, 438, 439, 441, 444; 423/6, 7; 521/29, 31–33

[56] References Cited

U.S. PATENT DOCUMENTS

| | | | |
|---|---|---|---|
| 2,260,971 | 10/1941 | Goetz | 210/24 |
| 2,671,059 | 3/1954 | Smit | 210/24 |
| 2,932,552 | 4/1960 | Weiss et al. | 210/37 B |
| 4,040,990 | 8/1977 | Neely | 521/29 |
| 4,081,512 | 3/1978 | Yang et al. | 55/74 |

*Primary Examiner*—Ivars C. Cintins
*Attorney, Agent, or Firm*—John E. Taylor, III

[57] ABSTRACT

Macroporous styrene polymer particles which have been partially pyrolyzed at temperatures between 300° and 800° C. to form non-functionalized, carbonaceous adsorbents, are functionalized according to this invention to produce weak base, strong base, weak acid or strong acid, dense ion exchange particles, or precursors thereof, using such reactions as halogenation, sulfonation, chloromethylation, chlorosulfonation and oxidation, alone or followed by aminolysis or other conventional functionalization reactions.

22 Claims, No Drawings

ION EXCHANGE MATERIAL PREPARED FROM PARTIALLY PYROLYZED MACROPOROUS POLYMER PARTICLES

BACKGROUND OF THE INVENTION

This invention relates to ion exchange materials, and more particularly to those ion exchange materials prepared by functionalizing partially pyrolyzed, macroporous polymer particles containing a carbon-fixing moiety. It further relates to the use of such materials for removal of ions from dense liquids.

Carbonaceous materials, such as charcoal, anthracite, activated carbon and peat have been functionalized in the past to produce compositions with ion exchange activity. Such ion exchange materials suffer from disadvantages common to carbonaceous adsorbents, including lack of control over starting materials, and friability of active carbon particles. They suffer further disadvantages of their own, including a limited number of functionalizing groups, and an interaction of adsorbent and ion exchange properties which makes regeneration difficult. Finally, they tend to have low ion exchange capacities.

As disclosed by Neely in U.S. Pat. No. 4,040,990, which is hereby incorporated into this specification by reference, adsorbent materials have been made by partially pyrolyzing macroporous polymer particles containing a carbon-fixing moiety. These carbonaceous materials possess several unusual properties which set them apart from prior carbonaceous adsorbents, including resistance to particle crushing, elimination of activation processes, and a high degree of control over particle shape and composition. These materials are further distinguished from activated carbon adsorbents by a much lower carbon to hydrogen ratio, being typically between about 2.0:1 and about 10:1, compared with the carbon to hydrogen ratio of activated carbon which is greater than 30:1, and by the presence of carbon-fixing moieties which permit the starting polymer to char without fusing in order to retain the macroporous structure of the polymer particles. The macropores range from about 5 to about 10,000 nanometers in average critical dimension, and are present with at least one other set of pores of a different average size (i.e., multimodal pore distribution), including smaller pores generally ranging in size from about 0.4 to about 5 nanometers, depending largely upon the maximum temperature during pyrolysis. The carbon-fixing moieties are discussed in the above-referenced U.S. patent of Neely. Although these pyrolyzed polymer particles may be made from polymers containing ion exchange functionality, they are themselves merely adsorbent materials, having lost their ion exchange functionality during pyrolysis. The term, "carbonaceous, macroporous polymer adsorbent particles", shall hereinafter refer specifically to these materials of the Neely patent, containing styrene as one of the ethylenically unsaturated monomers, and pyrolyzed at a temperature from about 300° to about 800° C.

It has been discovered that the carbonaceous, macroporous polymer adsorbent particles disclosed as adsorbents by Neely in the above-referenced U.S. Pat. No. 4,040,990 may be functionalized to prepare novel adsorbents with modified adsorption properties, novel ion exchange materials, or novel precursors thereof. This functionalization may occur subsequent to the pyrolysis described in U.S. Pat. No. 4,040,990, or it may occur simultaneously with such pyrolysis. It is critical to the preparation of the materials of this invention that the copolymers from which these novel materials are derived contain styrene as at least one of the ethylenically unsaturated monomers.

The new functionalized adsorbents, ion exchange materials (which may be of the strong acid, weak acid, strong base or weak base type), and functionalized precursor materials retain the macroporous structure of the original macroporous polymers from which they are derived, but they possess a substantially higher skeletal density, i.e., density of the material excluding void spaces due to particle porosity and to interstitial space between particles in a packed bed. Pore size and distribution may also be different. While these new materials may function as adsorbents because they have the high surface areas characteristic of carbonaceous macroporous polymer adsorbent particles and of macroreticular polymer adsorbent, they also may show enhanced specificity for certain adsorbates, and/or significant ion exchange capacity.

Observed reactions of the carbonaceous macroporous polymer adsorbent particles indicate that they contain many alkyl-substituted polycyclic aromatic hydrocarbon fragments. Examples 1 and 2, below, illustrate spontaneous, room-temperature chlorination of these polymers, which is characteristic of anthracenes, phenanthrenes and higher polycyclic aromatics. Substituted benzenes and naphthalenes do not undergo such a chlorination. Because of this hypothetical structure, it is expected that any conventional electrophilic substitution or addition that proceeds with polycyclic aromatic compounds, and any conventional free-radical substitution reaction that proceeds with aralkyl compounds and polymers such as alkyl-substituted polystyrenes, will be available for functionalizing the partially pyrolyzed carbonaceous macroporous polymer adsorbent particles. The functionalization reactions used are well known, and several are illustrated in the examples.

These functionalization reactions include, but are not limited to, halogenation, halosulfonation, sulfonation, halomethylation, amidomethylation, sulfonation, and oxidation, either alone or followed by amination, or amination and quaternization. The resulting functional groups include precursor groups to the ion exchange groups, such as covalent chlorine, covalent bromine, chloromethyl, bromomethyl and acylaminomethyl, and the ion exchange groups themselves such as sulfonyl chloride, sulfonic acid, amidomethyl, and carboxylic acid. The sulfonic acid functional group provides strongly acidic cation exchange functionality, and the carboxylic acid group provides weakly acidic cation exchange functionality. Anion exchange functionality may also be imparted to carbonaceous macroporous polymer adsorbent particles which have been functionalized with groups listed above. Thus, weakly basic anion exchange functional groups may be produced by (a) reacting chloride, bromide or chloromethyl groups with primary or secondary amines, and preferably those amines having 1-6 carbon atoms, (b) reacting chloride, bromide, chloromethyl, chlorosulfonyl or carboxylic acid groups with polyamines containing at least one primary or secondary nitrogen, and preferably those amines having 1-6 carbon atoms per amine nitrogen, or (c) hydrolyzing acylaminomethyl groups. Strongly basic anion exchange functionality may be produced by alkylating weakly basic groups with an alkylating reagent such as methyl chloride.

The temperature at which the polymers are pyrolyzed has an effect on the number of alkyl-substituted, polycyclic, aromatic hydrocarbon fragments available in the pyrolyzed polymer. At very low pyrolysis temperatures the formation of new carbon-carbon bonds to produce the polycyclic fragments is limited, and at very high pyrolysis temperatures the structure tends to become graphitic. Polymers pyrolyzed at temperatures from about 300° C. to about 800° C. are preferred for functionalization according to this invention.

It should be noted that the carbon-fixing moiety itself does no furnish functionality. For example, the sulfur and oxygen of the samples in Table III, Example 26, below, do not necessarily enter into further functionalization reactions, nor do they themselves contribute any ion exchange functionality. Similarly, chlorine may act as a carbon-fixing moiety in polymers such as vinylidene chloride or vinyl chloride, or when it is present on the polymer backbone of aromatic polymers. Here the chlorine is thought to fix carbon by means of a dehydrohalogenation reaction. The resulting pyrolyzed materials do not contain functional chlorine, although non-functional chlorine may be present at levels as high as 2–3%. The following is a further example of the difference between carbon-fixing moieties and functional groups, as shown in a simultaneous pyrolysis and chlorination performed similarly to the reactions of Example 26, below, but using a polymer which does not contain a carbon-fixing moiety such as the sulfonic acid of Resin A (below). In this example chlorine initially acts as a carbon-fixing moiety, causing the dehydrohalogenation which promotes carbon-fixing, but as the temperature increases, additional chlorine subsequently reacts with the partially pyrolyzed polymer in such a way as to form functional groups. Thus, in a single material some chlorine atoms are acting as carbon-fixing moiety, as described in U.S. Pat. No. 4,040,990, while other chlorine atoms are acting as the functional groups of the present invention. Similarly, functionalized materials of the present invention, especially the halogenated materials, may be re-pyrolyzed subsequent to functionalization. Functional groups such as the functional halogens may remain in the material following such a second pyrolysis. Although carbonaceous macroporous polymer adsorbent particles which otherwise would have no functionality following pyrolysis, but which have functionality as a result of simultaneous or subsequent functionalization, are the materials of the present invention, as a practical matter the preferred materials of the present invention contain a significant level of functionalization. Such preferred materials contain at least about 3%, more preferably at least about 5%, and most preferably at least about 8%, by weight of the functionalized material, of subsequently reactable functional groups, or they contain demonstrable ion exchange activity, preferably at least about 0.2 milliequivalents/gram, more preferably at least about 0.5 milliequivalents/gram, and most preferably at least about 1 milliequivalent/gram, each on a dry basis, of ion exchange material.

The high skeletal densities of the functionalized, carbonaceous macroporous polymer adsorbent particles and their high physical strength—typically significantly higher than that of the polymer particles prior to pyrolysis—make these materials especially well suited for moving-bed use in continuous deionization systems, and for use in treating dense streams such as uranyl salt solutions and sugar syrup process streams. The former streams typically have densities in the range of about 1.03 to 1.10 grams per cubic centimeter, while that of high-fructose corn syrup is typically about 1.18 grams per cubic centimeter. Densities of conventional resins used to treat such streams tend to be very close to these values, so that resin beads tend to float or settle very slowly. This necessitates special handling procedures or equipment to separate the resin beads from the process stream. The ion exchange particles of this invention have significantly higher densities than conventional, styrene-based ion exchange resins because their polymeric frameworks have higher skeletal densities. The skeletal density of Resin A (identified below), pyrolyzed at 500° C. is 1.34 g/cm$^3$, and that of the same resin pyrolyzed at 800° C. is 1.98 g/cm$^3$, compared with a skeletal density of 1.07 g/cm$^3$ for crosslinked polystyrene. These dense particles settle quickly in the relatively dense streams described above, and as a result permit conventional resin-bed techniques such as countercurrent-flow washing to be used in the processes for treating such streams.

The following examples serve to illustrate but not limit the invention. All percentages are by weight unless otherwise stated, and all reagents used are of good commercial quality.

EXAMPLE 1

In this example Amberlite 200 ion exchange resin (Rohm and Haas Company trademark for a macroporous, sulfonic acid functionalized, styrene-divinylbenzene resin, hereinafter referred to as Resin A), pyrolyzed at 500° C. according to the process of Neely, above, is reacted with chlorine gas to produce a chloride functionalized, or chlorinated, material. Chlorine gas is passed, at a rate of about 400 milliliters per minute, upward through a vertical glass tube containing 60.6 grams of the 500°-pyrolyzed ion exchage resin. Chlorine is removed from the gas stream and hydrogen chloride is evolved, this reaction being accompanied by a temperature increase of the pyrolyzed-resin bed to about 400° C. After one hour the stream of chlorine is stopped and the pyrolyzed resin bed is allowed to cool to room temperature. Excess gaseous chlorine is removed from the bed by sweeping it with a stream of nitrogen, and adsorbed chlorine and hydrogen chloride are removed by heating the pyrolyzed material to 110° C. for six hours while continuing to sweep it with the nitrogen stream. The resulting chloride functionalized material weighs 98.3 grams, a weight increase of 62.2%, and the chlorine content of the material is 38.38%.

The procedure described in Example 1 is repeated with materials resulting from pyrolyzing Resin A at 400° C. and at 300° C. The resulting chlorinated materials contain 34.67% and 28.80% of chlorine, respectively.

EXAMPLE 2

In this example a chloride functionalized, pyrolyzed ion exchange resin is produced by a different process than that of Example 1. A 32.0 gram sample of 500°-pyrolyzed Resin A is slurried with 500 milliliters of carbon tetrachloride, and chlorine gas is bubbled through the stirred mixture at about 400 milliliters per minute for two hours. During the chlorine addition hydrogen chloride is evolved. The chlorine flow is stopped, and excess chlorine and hydrogen chloride are removed from the slurry by purging it with nitrogen gas. The chlorinated particles are isolated by filtration, heated, and held at a temperature of 110° C. for 6 hours at atmospheric pressure to remove adsorbed chlorine and hydrogen chloride. The resulting chloride functionalized material weighs 43.0 grams, a weight increase of 34.5%, and the chlorine content of the material is 22.97%.

The procedure described in Example 2 is repeated with the particulate materials resulting from pyrolyzing Resin A at 400° C. and at 300° C. The resulting chlorinated particles contain 29.80% and 21.91% of chlorine, respectively.

EXAMPLE 3

In this example Resin A is chlorinated simultaneously with pyrolysis. A sample of the ion exchange resin in the hydrogen form is heated in a nitrogen stream to 500° C. over a period of 20 minutes. Chlorine is introduced to the nitrogen stream when the resin is at 500° C.; the chlorine content of the gas stream is five volume percent, the equivalent of 90 milliliters of chlorine gas per minute. Chlorine flow is continued at this rate over the 500° C. resin for 30 minutes, after which the chlorine flow is stopped and the material is allowed to cool to room temperature in the nitrogen stream. The resulting material contains 25.26% chlorine.

The procedure described in Example 3 is repeated, except that the temperature to which the resin is heated is 800° C. The resulting material contains 9.91% chlorine.

EXAMPLE 4

In this example Resin A, pyrolyzed at 500° C. as above, is reacted with sulfuryl chloride, $SO_2Cl_2$, to form a chloride functionalized material. A mixture of 10.0 grams of the pyrolyzed resin and 50 milliliters of carbon tetrachloride is charged to a 250-milliliter flask. The flask is vented to the atmosphere through a series of two traps, the first being empty to prevent the contents of the second trap being drawn into the flask, and the second containing a 25% aqueous sodium hydroxide solution to remove hydrogen chloride gas. While stirring the flask contents, 20 grams (0.148 moles) of sulfuryl chloride is added to the flask over a period of 15 minutes, the flask contents being maintained at a temperature of 25° C. Following addition of the sulfuryl chloride, the flask contents are heated to 60° C. and maintained at that temperature for 17 hours. The flask contents are then cooled in an ice bath, and 50 milliliters of water is added dropwise to the flask. The functionalized material is isolated by filtration, washed with 1 liter of water, washed with acetone until the washings are colorless, and then dried at a temperature of 110° C. The chlorine content of the dried material is 20.26%.

EXAMPLE 5

In this example the chlorinated material of Example 1 is aminated to form a weakly basic anion exchange material. A 5.00-gram sample of the chlorinated material of Example 1 is mixed with 50 milliliters of 3-(N,N-dimethylamino)propylamine (DMAPA). The mixture is stirred under a nitrogen atmosphere while the temperature is raised to 123° C. and held constant for 16 hours. The resulting material is filtered, washed with 1 liter of 4 weight percent aqueous sodium hydroxide solution followed by 1 liter of water, and dried overnight under vacuum at 70° C. The dried product in the free base form weighs 5.30 grams and contains 6.02% nitrogen and 19.86% chlorine; it has an anion exchange capacity of 1.30 milliequivalents per gram of dry resin. The true wet density of the product is 1.26 g/ml in the free base form. True wet density is the density of the resin including water of hydration and water within the resin pores, but excluding water in the interstitial spaces between particles in a packed column. The true wet density of weakly ion exchange resins prepared from macroreticular, crosslinked polystyrene particles is typically 1.04 to 1.05 g/ml in the free base form.

The observation of chlorine loss, nitrogen gain, and only 6% weight gain in Example 5 indicates that the chlorinated resin of Example 1 has three different kinds of chlorine atoms (a) those which are substituted by a nitrogen atom of DMAPA; (b) those which are eliminated as hydrogen chloride by DMAPA; and (c) those which do not react with DMAPA. Comparing the nitrogen content of the product with its anion exchange capacity indicates that only 30% of the nitrogen atoms are available as anion exchange sites.

EXAMPLE 6

The procedure of Example 5 is used to prepare ion exchange materials using the indicated chlorinated, pyrolyzed materials and amines given in the following table:

TABLE 1

| Chlorinated Resin | Amine[a] | Temp., ° C. | % N[b] | % Cl[b] | AEC, meg/g |
|---|---|---|---|---|---|
| Example 2 | DMAPA | 90 | 4.44 | 9.60 | 1.26 |
| Example 2 | TMIP | 90 | 3.84 | 11.63 | 1.00 |
| Example 2 | TEPA | 90 | 6.08 | 9.53 | 1.94[c] |
| Example 2 | DMAPA | 90 | 3.54 | 10.00 | 1.12 |
| Example 1 | PEI-6 | 150 | 6.98 | 17.72 | 1.74 |
| Example 2 | IBPA | 150 | 4.75 | 6.89 | 1.91 |
| Example 2 | DMA | 95 | 2.29 | 11.91 | 0.36 |
| Example 2 | TMA | 90 | 1.27 | 14.06 | 0.27 |
| Example 2 | PEI-6 | 150 | 4.76 | 11.12 | 1.75 |
| Example 3 | DMAPA | 90 | 4.80 | 17.41 | 0.29 |
| Example 4 | TEPA | 150 | 5.49 | 5.69 | 0.88 |

[a]DMAPA = 3-(N,N-dimethylamino)propylamine
TMIP = N,N,N',N-tetramethyl-3,3'-iminobispropylamine
TEPA = tetraethylenepentamine
PEI-6 = polyethyleneimine, molecular weight 600
IBPA = 3,3'-iminobispropylamine
DMA = 40% aqueous dimethylamine
TMA = 40% aqueous trimethylamine
[b]Analyses are performed on the free-base form of the ion exchange material.
[c]The true wet density of this resin is 1.24 g/ml in the free-base form.

EXAMPLE 7

The chlorinated material produced in Example 2, aminolyzed at 90° C. with DMAPA in Example 6, is further treated with excess methyl chloride at 90° C. The product is a strongly basic anion exchange material having a total anion exchange capacity of 0.96 milliequivalents per gram of dry product, and a strong-base anion exchange capacity of 0.60 milliequivalents per gram of dry product.

EXAMPLE 8

The chlorinated material produced in Example 2, aminolyzed at 150° C. with PEI-6 in Example 6, is further treated with excess formic acid and formaldehyde at 95° C. The product is an anion exchange material having an anion exchange capacity of 1.13 milliequivalents per gram of dry product.

EXAMPLE 9

In this example Resin A, pyrolyzed at 500° C., is reacted with bromine to produce a brominated, or bromine functionalized, material. A 49.9-gram sample of the pyrolyzed resin material is packed in a vertical, stainless steel tube, and a gas stream containing 20 volume percent bromine in nitrogen is passed upward through the tube at 1800 milliliters per minute. The temperature rise in the pyrolyzed material is measured by a thermocouple and is observed to reach a maximum of 100° C. after 100 minutes. The bromine flow is stopped after a calculated excess has been introduced, and the nitrogen flow is continued as the product is heated to 250° C. during 10 minutes and is maintained at that temperature for 10 minutes to drive off adsorbed bromine. After storage at 110° C. for 18 hours the sample weighs 77.8 grams, and its bromine content is 32.38%.

EXAMPLE 10

The brominated product of Example 9 is treated with excess DMAPA at 90° C. to produce a material with a bromine content of 17.65% after drying at 70° C. under vacuum. The anion exchange capacity of this material is 1.08 milliequailvalents per gram of dry product, which indicates that at least part of the bromine which was chemically replaced by DMAPA was covalently bound rather than adsorbed to the product.

EXAMPLE 11

In this example Resin A, pryolyzed at 500° C., is chloromethylated with chloromethyl methyl ether. A 500-milliliter, round-bottomed flask is charged with 40.0 grams of the pyrolyzed resin and 123 milliliters of chloromethyl methyl ether. The flask is fitted with a reflux condenser, stirrer and thermometer, and is warmed to 35° C. Over a 30-minute period small quantities of aluminum chloride are added from an Erlenmeyer flask through Gooch tubing, until a total of 26.8 grams has been added. The temperature is maintained at 35° C. and the flask contents are stirred for 3.5 hours; they are cooled to room temperature and poured, a small amount at a time, into a mixture of 200 grams of 50% aqueous sodium hydroxide solution, 400 milliliters of methanol and 50 milliliters of water. During the addition a brief temperature rise to 50° C. occurs. The product material is separated by filtration, washed with 2 liters of 4% aqueous sodium hydroxide solution, 1 liter of water, 1 liter of 4% aqueous hydrochloric acid solution, and 2 liters of water, respectively, and dried under vacuum at 60° C. The product weighs 48.2 grams, and contains 6.53% of chlorine, or 1.84 milliequivalents of chlorine per gram of dry product.

EXAMPLE 12

The product of Example 11 is aminated with IBPA at 110° C. according to the procedure of Example 5, to produce an anion exchange material which contains 4.19% nitrogen and less than 0.1% chlorine, and which has an anion exchange capacity of 2.77 milliequivalents per gram of dry product. The observed replacement of essentially all of the chlorine by an amine indicates that the pyrolyzed material is chloromethylated in the way expected of an aromatic polymer.

EXAMPLE 13

In this example 10.0 grams of Resin A, pyrolyzed at 500° C., is mixed with 50 grams of nitromethane and 7.5 grams of N-hydroxymethyl-N-methylformamide, and the mixture is stirred for 1 hour at room temperature. An ice bath is used to maintain the temperature at less than 25° C. while 50.0 grams of 99% sulfuric acid is added, with stirring, a drop at a time. After the sulfuric acid is added the ice bath is removed, and the mixture is stirred for 10 hours at room temperature. The resulting amidomethylated intermediate material is hydrolyzed by adding 30 milliliters of water and refluxing the mixture for 2 hours. The mixture is cooled, and the final product is washed with methanol, 4% aqueous sodium hydroxide solution and water, respectively. After drying under vacuum at 70° C. the product weighs 10.1 grams. It has a nitrogen content of 0.69%, and an anion exchange capacity of 0.34 milliequivalents per gram of dry product.

EXAMPLE 14

In this example Resin A, pyrolyzed at 400° C., is sulfonate functionalized. A 3.154 gram sample of the pyrolyzed resin is stirred with 100 milliliters of 96% sulfuric acid for 5.5 hours at 105° C. The mixture is cooled with an ice bath during the dropwise addition of water to about 250 milliliters total volume. The product is separated, washed with water, and dried under vacuum at 110° C. The dried product weighs 4.759 grams. It contains 12.20% sulfur and has a total cation exchange capacity of 3.78 milliequivalents per gram of dry product and a salt splitting (strong acid) cation exchange capacity of 2.61 milliequivalents per gram of dry product.

EXAMPLE 15

A 9.067-gram sample of Resin A, pyrolyzed at 400° C., is stirred under nitrogen with 100 milliliters of chlorosulfonic acid for 16 hours at 60° C. After cooling to room temperature the excess chlorosulfonic acid is removed by suction through a fritted glass filter stick. The product is slurried five times with dried 1,2-dichloroethane, removing the liquid each time through the filter stick. The product, still under nitrogen, is transferred to a fritted glass filter tube, and is washed with 500 milliliters of 1,2-dichloroethane followed by 500 milliliters of dried acetone. The product is dried under vacuum at 60° C.; after drying it weighs 15.583 grams and contains 12.10% sulfur and 11.98% chlorine.

EXAMPLE 16

A 3.379 gram sample of the chlorosulfonated product from Example 15 is washed with 1 liter each of 4% percent aqueous sodium hydroxide solution, water, 4% aqueous hydrochloric acid solution, and water, respectively. The product is dried under vacuum at 110° C.; the dry product weighs 2.926 grams and contains 12.73% sulfur and 3.99% chlorine. The total cation exchange capacity of the product is 3.62 milliequivalents per gram of dry product, and the salt-splitting cation exchange capacity is 2.58 milliequivalents per gram of dry product.

EXAMPLE 17

A 3.606-gram sample of the chlorosulfonated product from Example 15 is stirred with 12.5 grams of DMAPA for 1.5 hours at 60° C. The mixture is cooled and filtered, and the product is washed with water, 4% aqueous sodium hydroxide solution, and water, respectively. After drying under vacuum at 70° C. the product weighs 4.041 grams. It contains 7.30% nitrogen, 10.60% sulfur, and 4.14% chlorine. The product has an anion exchange capacity of 1.70 milliequivalents per gram of dry product, and a cation exchange capacity of 1.04 milliequivalents per gram of dry product.

EXAMPLE 18

In this example Resin A, pyrolyzed at 800° C., is oxidized with nitric acid to form a carboxylic acid functionalized material. A 100 gram sample of the pyrolyzed resin is stirred with 500 milliliters of concentrated nitric acid. The stirred mixture is heated to 80° C. and held at that temperature for 5 hours, after which it is cooled to room temperature. The mixture is poured slowly into one liter of water and washed with 4% aqueous sodium hydroxide solution, 4% aqueous hydrochloric acid solution, and water, respectively. After drying the product weighs 111.5 grams. A 106 gram sample of the product is mixed with 500 milliliters of concentrated nitric acid, heated to 80° C., and held at that temperature for three hours. The product is isolated as described above; it has a cation exchange capacity of 3.66 milliequivalents per gram of dry product for 0.1 normal sodium hydroxide solution, and a cation exchange capacity of 2.68 milliequivalents per gram of dry resin for 0.1 normal sodium carbonate solution.

EXAMPLE 19

A 10.0 gram sample of the product from Example 18 is stirred in a sealed reactor with 500 milliliters of dry DMAPA, heated, and held at a temperature of 233°–236° C. for 15 hours. During the reaction period the pressure in the reactor is observed to reach 154 pounds per square inch. Following recovery of the reaction product, it is found to have an anion exchange capacity of 1.22 milliequivalents per gram of dry product.

EXAMPLE 20

The procedure of Example 19 is used to produce anion exchange materials with the polyamines listed in Table II.

TABLE II

| Polyamine | Temp, ° C. | Anion Exchange Capacity meg/g dry | % N |
|---|---|---|---|
| DMAPA | 250–285 | 0.71 | 4.65 |
| Diethylenetriamine | 216–232 | 1.65 | 2.51 |
| Tetraethylenepentamine | 234–239 | 2.06 | 2.77 |

EXAMPLE 21

This example illustrates the use of compositions of this invention for recovering uranium from solution. A stock solution of uranyl sulfate is prepared by diluting 40.0 grams of $UO_2SO_4 \cdot 3H_2O$ and 90.0 grams of concentrated sulfuric acid to 20 liters with water. To 500 milliliters of the stock solution 2 grams of the aminated resin prepared with PEI-6 at 150° C. (as shown in Example 6) is added, and the mixture is stirred. Periodically the stirring is halted and the resin is allowed to settle. Small portions of the supernatant solution are assayed for uranyl ion content by treating them with excess sodium carbonate, to neutralize the sulfuric acid, adding aqueous hydrogen peroxide solution to form a uranyl peroxide complex, and determining the light absorbance of this complex in solution at a wavelength of 415 nanometers. After 60 minutes, removal of the uranyl ions from the solution is essentially complete, and the uranyl ion content of the resin is determined to be 27 milligrams of $U_3O_8$ per gram of dry ion exchange material.

EXAMPLE 22

This example illustrates the pyrolysis and chlorination of a styrene-divinylbenzene copolymer in which the carbon-fixing moiety is sulfuric acid imbibed into the macropores of the copolymer. A 16.1 gram sample of a dry, macroporous suspension copolymer of styrene crosslinked with 20% divinylbenzene is placed in a column and is washed in the downflow direction with one liter of 2-propanol, one liter of water and one liter of 62.4% aqueous sulfuric acid solution. Dry air is blown through the polymer bed for 15 minutes, to remove any sulfuric acid solution adhering to the outer surfaces of the polymer particles. The polymer is transferred to a quartz tube through which a stream of nitrogen is swept at 2000 ml/minute; the polymer is heated to 150° C. over a period of 5 minutes and held at that temperature for 40 minutes, heated to 300° C. over a period of 5 minutes and held at that temperature for 60 minutes, heated to 500° C. over a period of 5 minutes and held at that temperature for 60 minutes, and allowed to cool to room temperature in the nitrogen stream. The pyrolyzed polymer weighs 12.7 grams. Chlorination of 0.987 grams of this resin by the procedure of Example 1 yields 1.522 grams of product, a weight gain of 54.2% during chlorination. The maximum temperature reached during chlorination is 209° C.

EXAMPLE 23

This example illustrates the pyrolysis and chlorination of a sulfonic acid-functionalized, macroporous ion exchange resin prepared from styrene crosslinked with 50% divinylbenzene. The resin is pyrolyzed at 500° C. according to the process of Neely, above, and 13.4 grams of the pyrolyzed resin is treated with chlorine according to the procedure of Example 1 to yield 15.0 grams of chlorinated material containing 9.35% chlorine. The maximum temperature reached during chlorination is 92° C.

EXAMPLE 24

This example illustrates the preparation of an anion exchange material by chlorination and amination of a sulfonic acid-functionalized macroporous ion exchange resin prepared from styrene and 4% divinylbenzene. The resin is pyrolyzed at 500° C. according to the process of Neely, above, and 8.3 grams of the pyrolyzed material is treated with chlorine according to the procedure of Example 2 to yield 11.3 grams of material which contains 29.02% chlorine. This material is aminated for 16 hours at 110° C. with 3,3'-iminobispropylamine according to the procedure of Example 5, producing an anion exchange material which contains 4.31% nitrogen and 13.24% chlorine in its dry, free-base form, and which has an anion exchange capacity of 1.86 milliequivalents per gram of dry material.

EXAMPLE 25

In this example the ion exchange resin of Example 24 is pyrolyzed at 350° C., chlorinated and aminated. The pyrolysis procedure of Neely is used, and the pyrolyzed material is chlorinated according to Example 2; the chlorinated material contains 23.21% chlorine. This material is aminated for 16 hours at 110° C. with 3,3'-iminobispropylamine according to the procedure of Example 5, producing an anion exchange material which contains 4.22% nitrogen and 8.95% chlorine in its dry, free-base form, and which has an anion exchange capacity of 1.62 milliequivalents per gram of dry material.

EXAMPLE 26

The following example illustrates the adsorbent properties of the materials of this invention. Resin A, vacuum dried at 110° C. to greater than 99% solids, was heated in an atmosphere of nitrogen or of chlorine and nitrogen for the times and at the temperatures given in Table III, below. The samples heated in nitrogen without chlorine represent the materials of U.S. Pat. No. 4,040,990, while those subjected to partial pyrolysis in the present of chlorine, which contain significant amounts of chlorine following the pyrolysis represent the materials of the present invention. The compositions of the respective materials are shown, together with their surface areas, changes in bead volume during heating, decreases in volatile organic materials (shown in the "carbon yield" column), and the capacities for vapor adsorption.

TABLE III

Physical and Adsorption Properties of Adsorbents Prepared Via Pyrolysis of Dried Resin A in the Presence of Chlorine

| Sample No. | Pyrolysis Technique | Composition (Wt. %) | | | | | Surface Area $m^2/g$ | Volume Yield (%) | Carbon Yield (%)* | Vapor Capacities** | |
|---|---|---|---|---|---|---|---|---|---|---|---|
| | | C | H | O | S | Cl | | | | Hexane (cc/g) | $CCl_4$ (cc/g) |
| 1 | 500° C. in Nitrogen; No $Cl_2$ | 91.66 | 3.48 | 1.43 | 2.50 | — | 380 | 38.5 | 73 | 0.13 | 0.18 |
| 2 | to 250° C. in 5% $Cl_2/N_2$; to 500° C. in $N_2$ | 79.48 | 2.42 | 4.94 | 4.56 | 9.63 | — | 57.1 | 92.9 | — | — |
| 3 | to 500° C. in 5% $Cl_2/N_2$ | 64.53 | 0.64 | 6.61 | 3.30 | 25.26 | 356 | 70.3 | 86.9 | 0.15 | 0.09 |
| 4 | to 800° C. in $N_2$ | 90.77 | 0.84 | 4.93 | 2.04 | — | 350 | — | 67.1 | 0.26 | 0.04 |
| 5 | to 250° C. in 5% $Cl_2/N_2$; to 800° C. in $N_2$ | 90.67 | 0.83 | 4.19 | 3.97 | 2.39 | 545 | 56.3 | 85.8 | — | — |
| 6 | to 800° C. in 5% $Cl_2N_2$ | 80.63 | 0.27 | 4.65 | 4.31 | 11.70 | 558 | 65.7 | 89.4 | 0.29 | 0.20 |
| 7 | See Note 1 | 81.48 | 0.30 | 5.68 | 3.32 | 9.94 | 588 | — | — | 0.26 | 0.13 |

*(Wt. of carbon in product/wt. of carbon in starting material) × 100
**Relative pressure $P/P_o$ = 0.36
Note 1: Heated to 500° C. in $N_2$; reacted with $Cl_2$ at room temperature; heated to 800° C. in $N_2$.

We claim:

1. Macroporous, carbonaceous particles having high resistance to crushing and particle sloughage and bearing functional groups selected from the group consisting of ion exchange functional groups and precursors thereof, the particles being derived from carbonaceous, macroporous polymer adsorbent particles which
   (a) comprise the product of controlled thermal degradation at a temperature of about 300° C. to about 800° C. of a macroporous synthetic polymer containing macropores ranging from about 5 to about 10,000 nanometers in average critical dimension and containing a carbon-fixing moiety,
   (b) are themselves derived from one or more ethylenically unsaturated monomers, or monomers which may be condensed to yield macroporous polymers, or mixtures thereof, one of the monomers being styrene, and
   (c) have at least 85% by weight of carbon, multimodal pore distribution with macropores ranging in size from about 5 to about 10,000 nanometers in average critical dimension, and a carbon-to-hydrogen atom ratio of between about 1.5:1 and about 20:1.

2. Carbonaceous particles according to claim 1 wherein the functional groups are precursors of ion exchange functional groups.

3. Carbonaceous particles according to claim 2 wherein the functional groups are present at a level of at least about 3% by weight of the particles.

4. Carbonaceous particles according to claim 2 wherein the functional groups are present at a level of at least about 5% by weight of the particles.

5. Carbonaceous particles according to claim 2 wherein the functional groups are present at a level of at least about 8% by weight of the particles.

6. Carbonaceous particles according to claim 2 wherein the functional groups are selected from the group consisting of covalent chlorine, covalent bromine, chloromethyl, bromomethyl, and amidomethyl.

7. Carbonaceous particles according to claim 1 wherein the functional groups are ion exchange functional groups.

8. Carbonaceous particles according to claim 7 wherein the functional groups are present at a level of at least about 0.2 milliequivalents per gram of the particles.

9. Carbonaceous particles according to claim 7 wherein the functional groups are present at a level of at least about 0.5 milliequivalents per gram of the particles.

10. Carbonaceous particles according to claim 7 wherein the functional groups are present at a level of at least about 1 milliequivalent per gram of the particles.

11. Carbonaceous particles according to claim 7 wherein the ion exchange functional groups are anion exchange groups.

12. Carbonaceous particles according to claim 11 wherein the anion exchange groups are selected from the group consisting of amino, alkyl monosubstituted amino wherein the alkyl group contains 1–6 carbon atoms, alkyl disubstituted amino wherein the alkyl groups are independently selected and contain 1–6 carbon atoms, polyamino alkyl, alkyl substituted polyaminoalkyl, quaternary amino and alkyl substituted quaternary amino wherein the alkyl groups are independently selected and contain 1–6 carbon atoms per amine nitrogen.

13. Carbonaceous particles according to claim 7 wherein the ion exchange functional groups are cation exchange groups.

14. Carbonaceous particles according to claim 13 wherein the cation exchange groups are selected from the group consisting of sulfonic acid and carboxylic acid.

15. A process for preparing functionalized carbonaceous particles useful as selective adsorbents, ion exchange materials or precursors thereof, which process comprises reacting, at a temperature from about room temperature to about 500° C., a reagent selected from the group consisting of halogen gas, sulfuryl halide, halosulfonic acid, sulfuric acid, nitric acid, bis-halomethylmethyl ether, and N-hydroxymethyl-N-alkylformamides, with carbonaceous, macroporous polymer adsorbent particles which (a) comprise the product of controlled thermal degradation at a temperature from about 300° C. to about 800° C., of a macroporous, synthetic polymer containing macropores ranging from about 5 to about 10,000 nanometers in average critical dimension and containing a carbon-fixing moiety, (b) are derived from one or more ethylenically unsaturated monomers, or monomers which may be condensed to yield macroporous polymers, or mixtures thereof, one of the monomers being styrene, and (c) have at least 85% by weight of carbon, multimodal pore distribution with macropores ranging in size from about 5 to about 10,000 nanometers in average critical dimension, and a carbon-to-hydrogen atom ratio of between about 1.5:1 and about 20:1.

16. The process of claim 15 wherein the reagent is selected from the group consisting of halogen gas, sulfuryl halide, halosulfonic acid and bi-halomethylmethyl ether, and the particles are subsequently reacted with a reagent selected from the group consisting of primary amines having 1–6 carbon atoms, secodary amines having 1–6 carbon atoms, and polyalkylene polyamines having 1–6 carbon atoms per amine nitrogen.

17. The process of claim 15 wherein the reagent is an N-hydroxymethyl-N-alkyl formamide, and the resulting amidomethyl groups are subsequently hydrolyzed with acid.

18. A process for removing ions from solution which comprises contacting the solution, for sufficient time to permit ion exchange, with macroporous, carbonaceous, particles bearing ion exchange functional groups, the particles being derived from carbonaceous, macroporous polymer adsorbent particles which (a) comprise the product of controlled thermal degradation, at a temperature of about 300° C. to about 800° C., of a macroporous, synthetic polymer containing macropores ranging from about 5 to about 10,000 nanometers in average critical dimension and containing a carbon-fixing moiety, (b) are themselves derived from one or more ethylenically unsaturated monomers, or monomers which may be condensed to yield macroporous polymers, or mixtures thereof, one of the monomers being styrene, and (c) have at least 85% by weight of carbon, multimodal pore distribution with macropores ranging in size from about 5 to about 10,000 nanometers in average critical dimension, and a carbon-to-hydrogen atom ratio of between about 1.5:1 and about 20:1.

19. The process according to claim 18 wherein the solution has a density of from about 1.03 to about 1.2 grams per cubic centimeter, and the particles bearing ion exchange functional groups are separated from the solution by gravity subsequent to ion exchange.

20. The process according to claim 19 wherein the ions are uranyl ions and the functional groups are anion exchange groups.

21. The process according to claim 20 wherein the anion exchange groups are strongly basic.

22. A process for removing organic vapors from air which comprises contacting the air containing organic vapors with macroporous, carbonaceous particles bearing ion exchange functional groups, the particles being derived from carbonaceous, macroporous polymer adsorbent particles which (a) comprise the product of controlled thermal degradation at a temperature of about 300° C. to about 800° C. of a macroporous synthetic polymer containing macropores ranging from about 5 to about 10,000 nanometers in average critical dimension and containing a carbon-fixing moiety, (b) are themselves derived from one or more ethylenically unsaturated monomers, or monomers which may be condensed to yield macroporous polymers, or mixtures thereof, one of the monomers being styrene, and (c) have at least 85% by weight of carbon, multimodal pore distribution with macropores ranging in size from about 5 to about 10,000 nanometers in average critical dimension, and a carbon-to-hydrogen atom ratio of between about 1.5:1 and about 20:1.

* * * * *